United States Patent
Cyr et al.

(10) Patent No.: US 8,046,747 B2
(45) Date of Patent: *Oct. 25, 2011

(54) APPARATUS AND SYSTEMS FOR MEASURING, MONITORING, TRACKING AND SIMULATING ENTERPRISE COMMUNICATIONS AND PROCESSES

(75) Inventors: Vincent R. Cyr, Glen Mills, PA (US); Kenneth Fritz, Glen Mills, PA (US)

(73) Assignee: YYZ, LLC, Glen Mills, PA (US)

( * ) Notice: Subject to any disclaimer, the term of this patent is extended or adjusted under 35 U.S.C. 154(b) by 1224 days.

This patent is subject to a terminal disclaimer.

(21) Appl. No.: 11/356,538

(22) Filed: Feb. 17, 2006

(65) Prior Publication Data

US 2006/0150156 A1 Jul. 6, 2006

Related U.S. Application Data

(62) Division of application No. 09/737,494, filed on Dec. 15, 2000, now Pat. No. 7,062,749.

(51) Int. Cl.
*G06F 9/44* (2006.01)

(52) U.S. Cl. ........ 717/135; 717/102; 717/103; 717/105; 717/120; 703/17; 703/19; 709/224

(58) Field of Classification Search .................. 717/100, 717/102, 103
See application file for complete search history.

(56) References Cited

U.S. PATENT DOCUMENTS

| | | | | |
|---|---|---|---|---|
| 4,821,220 A | * | 4/1989 | Duisberg | 703/2 |
| 4,914,567 A | * | 4/1990 | Lipkis et al. | 700/83 |
| 5,404,501 A | | 4/1995 | Carr et al. | |
| 5,504,897 A | * | 4/1996 | Gans et al. | 707/104.1 |
| 5,553,008 A | * | 9/1996 | Huang et al. | 703/14 |
| 5,673,367 A | * | 9/1997 | Buckley | 706/23 |
| 5,740,463 A | * | 4/1998 | Oshima et al. | 712/11 |
| 5,764,953 A | * | 6/1998 | Collins et al. | 703/17 |
| 5,794,005 A | * | 8/1998 | Steinman | 703/17 |
| 5,805,867 A | * | 9/1998 | Kodaira | 703/21 |
| 5,887,167 A | | 3/1999 | Sutton | |
| 5,949,998 A | | 9/1999 | Fowlow et al. | |
| 5,960,200 A | | 9/1999 | Eager et al. | |
| 5,980,096 A | * | 11/1999 | Thalhammer-Reyero | 1/1 |
| 6,018,627 A | | 1/2000 | Iyengar et al. | |
| 6,021,438 A | * | 2/2000 | Duvvoori et al. | 709/224 |
| 6,092,102 A | | 7/2000 | Wagner | |
| 6,099,577 A | * | 8/2000 | Isobe | 716/2 |
| 6,138,143 A | * | 10/2000 | Gigliotti et al. | 709/203 |
| 6,324,495 B1 | * | 11/2001 | Steinman | 703/17 |
| 6,370,494 B1 | * | 4/2002 | Mizuno et al. | 703/17 |
| 6,460,175 B1 | | 10/2002 | Ferri et al. | |
| 6,501,950 B1 | | 12/2002 | Smith et al. | |

(Continued)

OTHER PUBLICATIONS

An Asynchronous Distributed Discrete Event Simulation Algorithm for cyclic circuits using a dataflow network, IEEE, Ghosh el al, dated: Aug. 1991.*

(Continued)

*Primary Examiner* — Chameli C Das

(57) ABSTRACT

The present invention comprises apparatus and systems for measuring, monitoring, tracking and simulating enterprise communications and processes. A central message repository or database is constructed, comprised of monitoring messages sent from process messaging systems. The database may then be accessed or queried as desired. A simulation tool assists in reviewing present and proposed processes and subprocesses before modifying existent systems or creating new systems.

13 Claims, 8 Drawing Sheets

U.S. PATENT DOCUMENTS

| | | | |
|---|---|---|---|
| 6,510,429 B1 | 1/2003 | Todd | |
| 6,529,932 B1 | 3/2003 | Dadiomov et al. | |
| 6,543,047 B1 | 4/2003 | Vrhel et al. | |
| 6,550,057 B1 * | 4/2003 | Bowman-Amuah | 717/126 |
| 6,553,438 B1 | 4/2003 | Coffman et al. | |
| 6,601,233 B1 * | 7/2003 | Underwood | 717/102 |
| 6,662,355 B1 | 12/2003 | Caswell et al. | |
| 6,681,245 B1 | 1/2004 | Sasagawa | |
| 6,725,445 B1 | 4/2004 | Leymann et al. | |
| 6,728,947 B1 | 4/2004 | Bengston | |
| 6,757,710 B2 | 6/2004 | Reed | |
| 6,789,252 B1 | 9/2004 | Burke et al. | |
| 6,901,430 B1 | 5/2005 | Smith | |
| 6,934,749 B1 * | 8/2005 | Black et al. | 709/224 |
| 6,943,681 B2 | 9/2005 | Rezvani et al. | |
| 7,155,708 B2 * | 12/2006 | Hammes et al. | 717/155 |
| 7,206,805 B1 * | 4/2007 | McLaughlin, Jr. | 709/203 |
| 7,328,429 B2 * | 2/2008 | Hooper et al. | 717/128 |
| 7,444,638 B1 * | 10/2008 | Xu | 718/104 |
| 7,490,029 B2 * | 2/2009 | Wasynczuk et al. | 703/17 |
| 7,590,519 B2 * | 9/2009 | Lin et al. | 703/17 |
| 7,689,998 B1 * | 3/2010 | Chrysanthakopoulos | 718/104 |
| 2002/0052725 A1 * | 5/2002 | Wasynczuk et al. | 703/22 |
| 2004/0040025 A1 * | 2/2004 | Lehtinen | 718/104 |
| 2004/0088691 A1 * | 5/2004 | Hammes et al. | 717/158 |
| 2004/0243978 A1 * | 12/2004 | Walmsley | 717/120 |
| 2006/0149526 A1 * | 7/2006 | Torossian et al. | 703/16 |
| 2010/0223041 A1 * | 9/2010 | Bolcato et al. | 703/2 |

OTHER PUBLICATIONS

Title: Latency Measurement Obtained from the Simulation Network Analysis Project: author: Purdy et al, source: IEEE, dated: Jul. 20, 1998.*

"Implementing SAP R/3 How to Introduce a Large System into a Large Organization," pp. 1-73, N.H. Bancroft et al., 1997.

"SAP An Executive Comprehensive Guide," Grant Norris et al., pp. 1-13, 1998.

Windows NT Server Operating System, Microsoft Message Queuing Services, Microsoft, 1997, pp. 1-38.

Messaging & Queuing Using the MQI, burnie Blakey et al., Jun. 26, 1995, Whole Book.

Building Distributed Applications with Message Queing Middleware, Peter Houston, Microsoft Corp., Mar. 1998, 7 pages.

"Special Issue on TP Monitors and Distributed Transaction Management," Ron Obermarck et al., Data Engineering, Mar. 1994, vol. 17, No. 1, IEEE Computer Society, 32 pages.

"Remote Queues: Exposing Message Queues for Optimization and Atomicity," E.A. Brewer et al., MCM, 1995, pp. 42-53.

* cited by examiner

Summary Of Orders

Your Information

| Customer Number | Company | Location |
|---|---|---|
| 5000 | Dow Chemical | Midland, MI |

Current Orders, Quotes, and Inquiries

Click on an order to view its detailed status and history

| Date | Transaction ID | Order Number | Current Status |
|---|---|---|---|
| 3/27/2000 | 0003 | 800000 | INVOICE |
| 3/29/2000 | 2102 | 839400 | MANUFACTURE |
| 3/31/2000 | 2204 | 940302 | ORDER |

*Figure 3*

Order History and Tracking Information

[illegible] at 12:15

Your Information

| Customer Number | Company | Location |
|---|---|---|
| 1000 | Dow Chemical | Midland, MI |

Current Order Status  Transaction 000/Order 800000

📄 INVOICE

Invoice Date: 3/31/00

Order Detail

| Material Name | Material Number | Unit of Measure | Quantity | Price Each |
|---|---|---|---|---|
| Widget | 800003 | BOX | 2 | 2.00 |

Order History

INQUIRY
| Date | Time | Quote Number |
|---|---|---|
| 3/24/2000 | 21:00 | 200001 |

QUOTE
| Date | Time |
|---|---|
| 3/24/2000 | 21:15 |

AGREEMENT
| Date | Time |
|---|---|
| 3/26/2000 | 18:15 |

ORDER
| Date | Time | Order Number |
|---|---|---|
| 3/27/2000 | 12:00 | 800000 |

SCHEDULE
| Date | Time |
|---|---|
| 3/28/2000 | 17:00 |

MANUFACTURE
| Date | Time | Production Number | Production Location | Status |
|---|---|---|---|---|
| 3/29/2000 | 11:34 | 410000 | LOCAL | N/A |

SHIP
| Date | Time | Shipping Method | Tracking Number |
|---|---|---|---|
| 3/31/2000 | 21:00 | UPS | 0123345090 |

INVOICE
| Date | Time | Order Number |
|---|---|---|
| 3/31/2000 | 21:00 | 800000 |

APPARATUS AND SYSTEMS FOR MEASURING, MONITORING, TRACKING AND SIMULATING ENTERPRISE COMMUNICATIONS AND PROCESSES

CROSS REFERENCE TO RELATED APPLICATION

This application is a divisional of and claims the benefit of U.S. patent application Ser. No. 09/737,494 filed Dec. 15, 2000, entitled Apparatus and Methods for Isolating and Reviewing Data from Multiple Sources, now issued U.S. Pat. No. 7,062,749.

The present invention relates to apparatus and systems for measuring, monitoring, tracking and simulating enterprise communications and processes. More particularly, the present invention relates to computer-based apparatus and systems for measuring, monitoring, tracking and simulating enterprise communications and processes in an asynchronous messaging environment.

BACKGROUND OF THE INVENTION

The activities of a business or enterprise can be grouped into processes. Processes are business operations that are separated as desired and usually occur across business units. For example, the process of taking orders and turning those orders into revenue may be known as Order to Cash. The processes are comprised of sub-processes. For example, Order to Cash may be broken down into sub-processes such as Receive Order Inquiry, Provide Customer Quotation, Create Customer Outline Agreement, Create Sales Order, Schedule Production, Manufacture Product, Ship Product and Invoice Customer. Each sub-process may in turn be broken down into discrete activities such as providing customer number, entering that customer number, establishing pricing, determining a shipping date, etc.

The processes, sub-processes and activities operate, in part, by communicating information. For example, users may communicate through email. As another example, applications may communicate amongst themselves through electronic data interchange ("EDI") and other similar services. Communication occurs horizontally, that is, among a process, sub-process and activities, as well as vertically, that is, between processes, sub-processes and activities.

Whether communications occur horizontally or vertically, among applications or users, communications are increasingly asynchronous or message based. That is, enterprise communications were formerly primarily synchronous, or connection oriented, in which a connection is established with prior coordination between communication end points with data then being transmitted over the connection. Enterprise communications are now increasingly asynchronous, or connectionless, transmitting data without prior coordination between communication end points, such as through "event based" communications which use messages to move data instead of large files.

Asynchronous or message based communications permit loosely coupled connections among and between systems because the end points do not have to be prepared to receive the data when the message is transmitted. Loosely coupled connections permit more flexibility in assembling processes. Flexibility in assembling processes is desirable in order to permit quick reaction to changing business conditions: if a particular sub-process or activity becomes unusable, the process can be reassembled with a new sub-process or activity. For example, if a Manufacture Product sub-process in the Order to Cash process at Widget Co. enterprise has a specific factory identified to manufacture the product and that factory has a fire or other disaster, making it unusable, Widget Co. will need to substitute a new factory. The ripple effect of that substitution among all of Widget Co.'s processes will change any number of parameters. A loosely coupled asynchronous connection among Widget Co.'s processes provides rapid substitution of the new factory for the old because the end points of communication to the new factory do not have to be predetermined before communications begin with the new factory. Thus, the flexibility of the asynchronous message based communication has permitted quick response to changing business conditions.

Despite this flexibility, asynchronous or message based communications are problematic because of their loosely coupled nature. At any given time, precise information on the progress of the processes is difficult to obtain—messages may be in transit and not instantly locatable. For example, if a customer calls for the status of an order, an enterprise customer service representative may be able to determine nothing more than the fact that the order has been received and that the scheduled ship date is X. There is often no ability to drill down into the information levels and review the status in more granularity, such as the location of the good, the manufacturing status, etc., because the information required to review that status is in transit and unable to be reviewed.

Of course, if the enterprise lacks the ability to access status information, business partners of the enterprise will similarly lack that ability. Thus, asynchronous communications may well increase inefficiency among business partners as well.

The difficulty in reporting caused by message based architecture also makes it difficult for the enterprise to measure the efficiency of its processes and their sub-process. Asynchronous messaging, with its indeterminate transmission of information, means a company may not be able to easily measure the interval between each sub-process, e.g. the time between Scheduling Production and the Manufacturing of a Product, and so easily measure the efficiency of their operations.

Finally, asynchronous messaging may provide an enterprise with an ability to model and simulate processes. That is, since information flows can be readily estimated through enterprises with asynchronous messaging, and processes can be easily modeled from those flows, asynchronous messaging modeling provides the potential to model and simulate processes. That potential is not realized with present technology, however. Moreover, since as described above, enterprises lack information on the processes they have implemented, the enterprises are handicapped in their ability to modify those processes or plan new processes. A modeling and simulation tool, demonstrating processes, sub-processes and their activity or granular detail level would be extremely helpful, and would give the enterprise an opportunity to assemble, test, adjust, and simulate processes and their details.

Accordingly, it is an object of the present invention to provide a tool for simulating message based architectures.

It is a further object of the present invention to provide monitoring capabilities for enterprise processes.

SUMMARY OF THE INVENTION

The present invention comprises apparatus and systems for measuring, monitoring, tracking and simulating enterprise communications and processes in an asynchronous messaging environment. For each original message sent within a process, sub-process or activity, the preferred embodiments of the present invention send a separate monitoring message containing data from the central message repository or database. This data may include date, time, customer number, materials, quantity, amount, or other information, and be copied from the original message. Other embodiments may add data to the monitoring message aside from that contained in the original message.

This central message repository or database is comprised of information passing through the enterprise. In effect, the database provides a collection point or an "end point" for the asynchronous communications, and so allows the flexibility of asynchronous communications to be combined with the precision of synchronous communications. The database can be reviewed in any number of ways. For example, the database can be queried to obtain specific information about that particular order or customer or could be examined across larger time spans such as days, weeks, or months, to gauge trends or performance. Of course, some preferred embodiments may wish to create mirror databases or other databases that can be used in various ways.

An enterprise's information flow can also be readily modeled and simulated through creating new process, sub-process and/or activities or altering existing process, sub-process or activities. The information flows from those creations or alterations can be collected in one or more databases and examined as desired.

BRIEF DESCRIPTION OF THE DRAWINGS

FIG. 3 shows a screen of a preferred embodiment.
FIG. 4 shows a screen of a preferred embodiment.
FIG. 8 shows a partial view of a preferred embodiment.
FIG. 9 shows a partial view of a preferred embodiment.

DETAILED DESCRIPTION OF THE PREFERRED EMBODIMENTS

Figure 1:
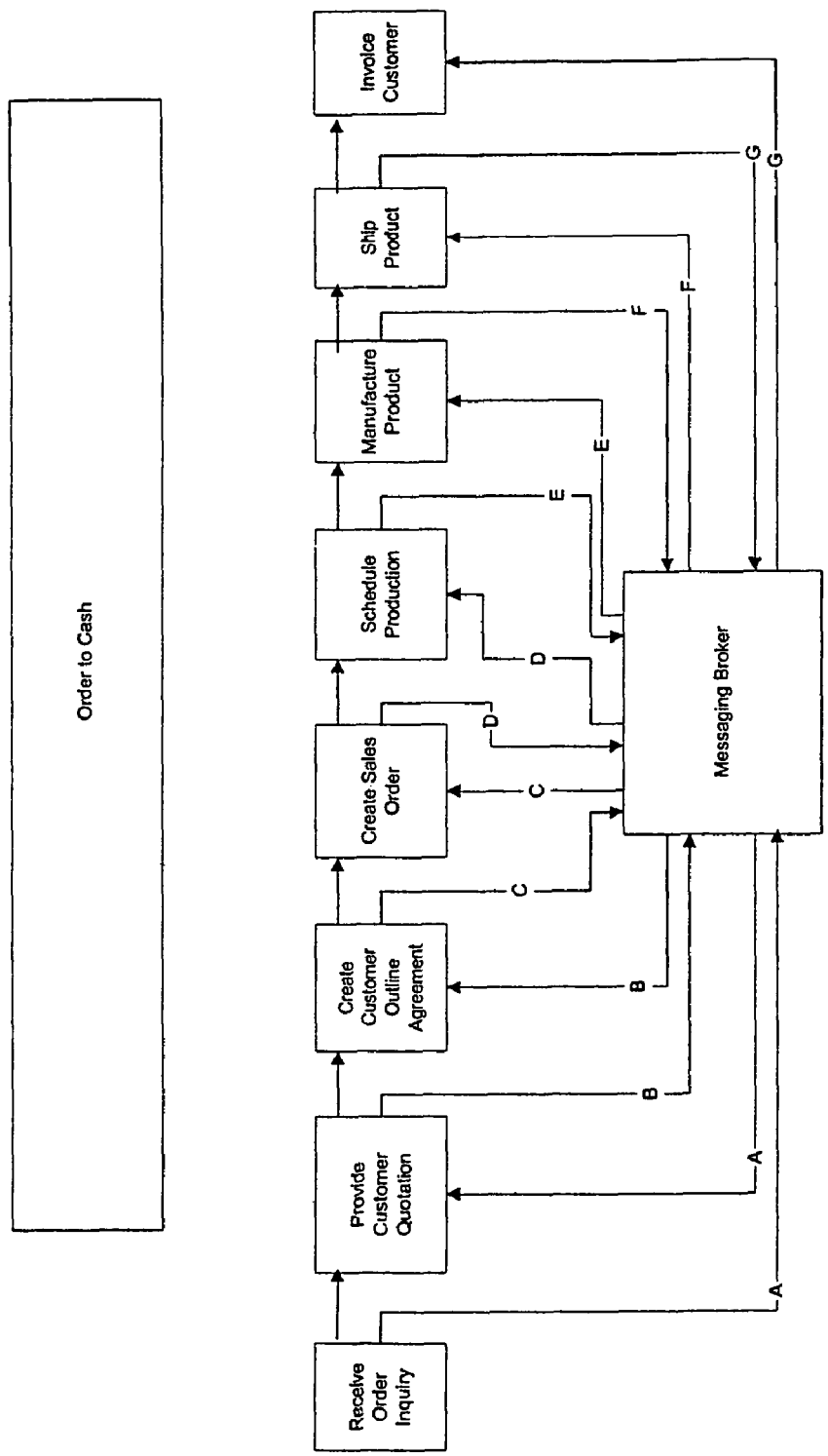
FIG. 1 shows a view of a process.

FIG. 1 shows a sample process, Order to Cash, which is comprised of various sub-processes: Receive Order Inquiry, Provide Customer Quotation, Create Customer Outline Agreement, Create Sales Order, Schedule Production, Manufacture Product, Ship Product and Invoice Customer. The dashed line arrows connecting the sub-processes are the communication paths between the sub-processes. In the example shown in the figure, the sub-processes actually communicate through a messaging broker, such as an IBM MQSeries component, and the paths to and from the component are identified identically. This messaging broker permits certain sophisticated messaging uses, such as message queuing, some data translation, etc.

A messaging component is added to the messaging broker, through methods known in the art. This messaging component creates a "monitoring" message for each original message received by the broker. This monitoring message contains, in this embodiment, specific data generated from the original messages passing between the sub-processes. The monitoring message with its data is then sent from the messaging broker to a central database repository or database (the terms "repository" or "database" are used interchangeably throughout.)

The messaging component may be, in some embodiments, or may not be, in other embodiments, provided by the messaging broker. For example, IBM's MQSeries messaging broker provides a component that can be configured to perform a copying function for the messages it receives, and so create monitoring messages for the messages it receives.

Figure 2:
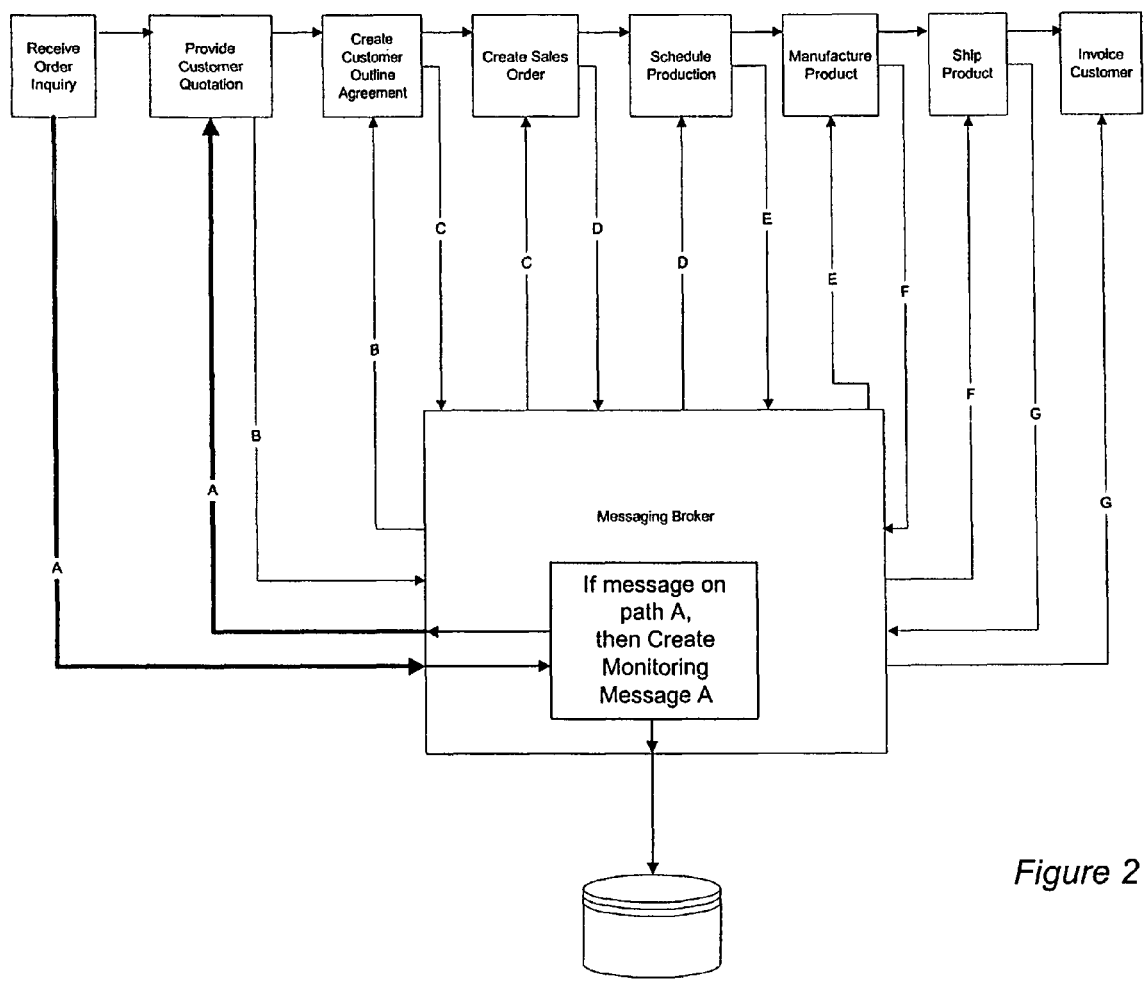
FIG. 2 shows a view of a process of a preferred embodiment.

The specific data contained in the monitoring messages (in this embodiment, this data is copied from the original messages passing between the sub-processes) is organized into data fields. Those data fields are path specific in this embodiment. For example, assume a customer calls the enterprise (Widget Co.) whose process is shown in FIG. 1 and asks whether or not Widget Co. has a certain product (Type A Widgets.) That customer request will begin the Receive Order Inquiry sub-process which will end with the generation of a Receive Order Inquiry message traveling to the Provide Customer Quotation sub-process through the messaging broker component. When the messaging broker receives the message on Path A, it will create a monitoring message, and send the monitoring message to the central database repository, as shown in FIG. 2. In this embodiment, the data contained in the monitoring message is generated from the message on Path A. Other preferred embodiments may alter or add data to the monitoring messages aside from that contained in the original message.

The monitoring message contains, in this embodiment, specific data fields. (Of course, other embodiments may have different data fields.) Those data fields are:

| FIELDS | IDENTIFIERS |
| --- | --- |
| PROCESS IDENTIFIER | ProID, |
| SUB-PROCESS IDENTIFIER | SbProID, |
| CUSTOMER NUMBER | Custno, |
| PART NUMBER | Partno, |
| QUANTITY | Qty, |
| DATE | Date, |
| TIME | Time |

The first field, the PROCESS IDENTIFIER field, provides the identifier for the process, for example, the value "Order to Cash" because the monitoring message is being created within the Order to Cash process. The second field, the SUB-PROCESS IDENTIFIER field, provides the identifier for the sub-process, for example, the value "Inquiry" because the monitoring message is being created within the Inquiry sub-process. This embodiment prepopulates these PROCESS IDENTIFIER and SUB-PROCESS IDENTIFIER fields, with the appropriate values.

The CUSTOMER NUMBER field is assigned to the particular customer generating the inquiry. The PART NUMBER field is the identifier for the particular part and the QUANTITY for the particular quantity. DATE and TIME are the data and time the message is generated. Other message fields for other paths of this embodiment are shown in Table 1. Of course, some, all or none of these fields may be present in other embodiments, as well as other fields as desired. For example, one or more ACTIVITY IDENTIFIER fields may be present in monitoring messages in other embodiments.

The monitoring message data populates one information flow or transaction record ("transaction record.") As monitoring messages progress through any given process and/or sub-process, the transaction record is updated. Once the monitoring messages complete the transaction record, all of the information needed to measure that transaction through the process is contained in one record in the central message database. (Of course, if the monitoring messages do not fully populate the transaction record, e.g., the transaction is aborted in mid process, then these abandoned records may be made available as well with an indication that they were abandoned.)

The central message database can be reviewed in any number of ways, in order to measure, monitor and track enterprise communications and processes, e.g., to provide information or generate reports. Using the central message database to provide information or generate reports "off loads" the information access or reporting processes from the applications that generate messages initially, e.g., sub-processes such as those seen in FIG. 1. This off loading relieves some of the monitoring pressure from the source applications so that, for example, any queries that might have been made to the source applications and interfere with or slow down the operation of the source applications can now be made through the central message database.

The information retrieved from the central message database may include, but is not limited to, information about any particular order or customer, information about process efficiency, "snapshot" or time slice information, information across time spans such as days, weeks, or months, information to gauge trends or performance, etc. Also, in some embodiments, a "real-time" tool may be used to track the progress of transaction records and/or processes and use distribution methods such as broadcasting, WAP, etc. to provide the information to users. For example, if a process such as pipeline capacity for oil and natural gas transmissions is implemented and monitored through an embodiment of the present invention, the central message database will constantly broadcast unused pipeline capacity, which information in turn can be used to sell, trade or barter that unused capacity. As another example, information about an enterprise's processes can be made available over an intranet, extranet, the Internet, etc. to business partners or other entities. One example would be providing information to stock analysts so that they could track any particular enterprise's productivity or other areas of interest. Another example would be providing information to actual or potential business partners to check production capacity, shipping capacity, or other areas of interest. In some embodiments, with regard to external entities, communication channels between the external entities and the enterprise might well be established, so that central message databases exist on both ends of the communication channel.

The central message database allows for broader analysis of trends that may include: time between sub-processes, variances by customer, variances by order amount, bottlenecks in the process, etc. For example, it would be possible to determine how many orders stood between Order and Invoice. This may allow for the acceleration of some orders so they could be booked by quarter close. For example, a vendor bottleneck may be identified in the course of review of the processes, sub-processes and/or activities. For example, seasonal variations in processes, sub-processes and/or activities may be identified as well.

Of course, some embodiments may create mirror databases and/or generate other databases that can be used by various entities. For example, an enterprise may create a number of central message databases which could track processes, sub-processes and/or activities in whole or part. These databases could also be combined as desired.

Monitoring message database(s) may be used, in some embodiments, in various ways, either in addition to or instead of central message database(s.) For example, a monitoring message database or a central message database may be used to generate messages and feedback to the processes, sub-processes, activities and/or applications, as well as to users and/or administrators (herein generally "users.") Various messages transmitted from sub-process applications such as error messages would generate special monitoring messages which would be added to a message monitoring database. Other events, exceptions, triggers and thresholds, could be tracked as well in various embodiments and be used to signal conditions, problems, etc. by various methods such as "flagged" or specially designated messages or other indicators.

Access to the database(s) is, in the preferred embodiments, on a secured or authorized basis, with different users obtaining different levels of access to the data in the database.

FIG. 3 shows a screen shot of an example of a preferred embodiment where access was made available to a customer over a corporate extranet. The screen shot is of a report, generated through an XML link to the central message database, of that particular customer's orders. In the preferred embodiments, the customer has the option to "drill down" through this screen to other screens for further detail. So, for example, FIG. 4 shows a result of one such operation, where the customer had drilled down from the screen of FIG. 3. Of course, these records may vary depending on the status of the transaction, that is, whether the transaction is in the middle of the process, at the beginning of the process, etc. Furthermore, other reporting options may be seen depending on the embodiments. Additionally, in some embodiments the user may have the option to drill down further into or past these levels if desired.

The preferred embodiments of the present invention also provide a simulation module for business processes. The simulation module makes possible simulation of new processes, their sub-processes and the activities that make up the sub-processes. This provides the enterprise or other user with the opportunity to assemble, test, adjust, and simulate processes before they are integrated into the enterprise.

The simulation module of the preferred embodiments provides the ability to assemble simulated processes in two primary ways. The first primary way is through provision of a toolkit or palette of predetermined sub-processes to the user. The user can then choose from that palette of sub-processes to form a process for an organization, which is then used in the simulation as is explained in further detail below.

The second primary method of assembling processes is to provide the user with activities, which are the most granular construct of a sub-process. Additionally, more sophisticated users will be given the opportunity to assemble their own activities. Either or both options of this second primary method can be offered in various embodiments. Additionally, the first and second primary methods can be combined in certain embodiments as well.

The preferred embodiments permit use of discrete activities among sub-processes, perhaps in an object oriented format, in order to save time and increase productivity. These activities can then be connected to form one or more sub-processes, which in turn can be connected to form one or more processes. The ability to create additional sub-processes would allow for the company to add their unique sub-processes to the palette.

It should be noted that in other embodiments, the simulation module may be constructed in other ways. For example, preconfigured, industry-specific processes may be supplied that can be altered and/or provided with enterprise specifics.

The simulation model is contained, in the preferred embodiments, on a corporate intranet or extranet. The underlying assumption of the simulation model in the preferred embodiments is that the completion of each sub-process will generate a message. So, for example, if a process such as that of FIG. 1 is simulated, the completion of the first sub-process will generate a message to be sent to the next sub-process, the completion of the next sub-process will generate a message that will be sent to the next sub-process, and so on.

Figure 5:
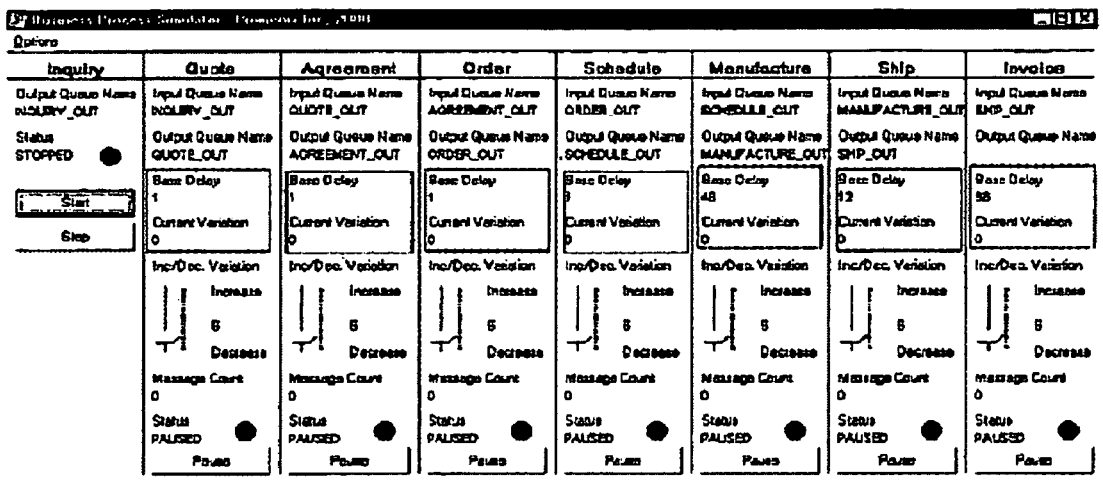
FIG. 5 shows a screen of a preferred embodiment.

FIG. 5 shows a process development environment screen for an example process called "Order" of the simulation module. Sub-processes Inquiry, Quote, Agreement, Order, Schedule, Manufacture, Ship and Invoice have been joined together to comprise this process. The sub-processes, in this example, are predetermined and their activities are predetermined. The input and output queue names are identified where appropriate. For example, the output queue name in the Inquiry sub-process is INQUIRY_OUT. That output queue then feeds data into the input queue of the Quote sub-process. (These are analogous to Path A in FIG. 1.) The base delay provides the initial time of a sub-process. For example, the base delay for the Quote Sub-process is 1 or a time increment of 1. In contrast the Manufacture Sub-process base delay is 48, so that the time increment for the Manufacture Sub-process is 48. The Current Variation shows the Increase/Decrease Variation set by the slider, permitting an increase or decrease in the latency per process and thus permits the user to see the downstream effect of altering each sub-process time. (Other embodiments may use different apparatus and methods as known in the art to vary the latency of the sub-process.) In this example, the total time of the process is obtained by adding each base delay of each sub-process, however, each sub-process may not affect the other in a geometric or logarithmic progression. For example, varying the base delay by one time increment of the Quote sub-process may not lead to an exact one time increment variation in the Scheduling sub-process.

Figure 6:
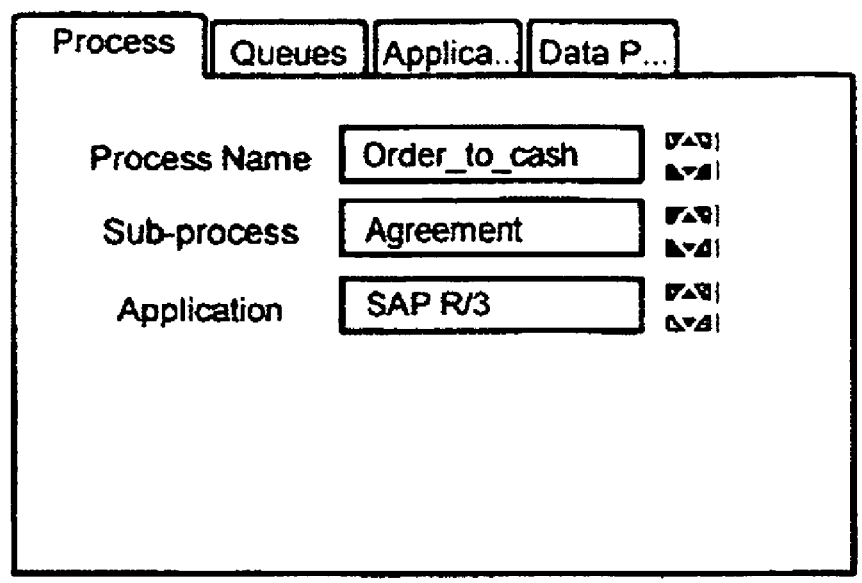
FIG. 6 shows a partial view of a preferred embodiment.

FIGS. 6 through 9 are examples of tools that are used in this embodiment to construct sub-process modules such as those used in FIG. 5. For example, FIG. 6 shows the properties of the Agreement sub-process module, which are the process, the sub-process and the application used in the sub-process. The process and sub-process are predetermined in this module. The user has the option of setting the application alternative of the sub-process to one or more predetermined alternatives. These alternatives would be used, for example, when a new application might be used to provide output from the sub-process.

Figure 7:
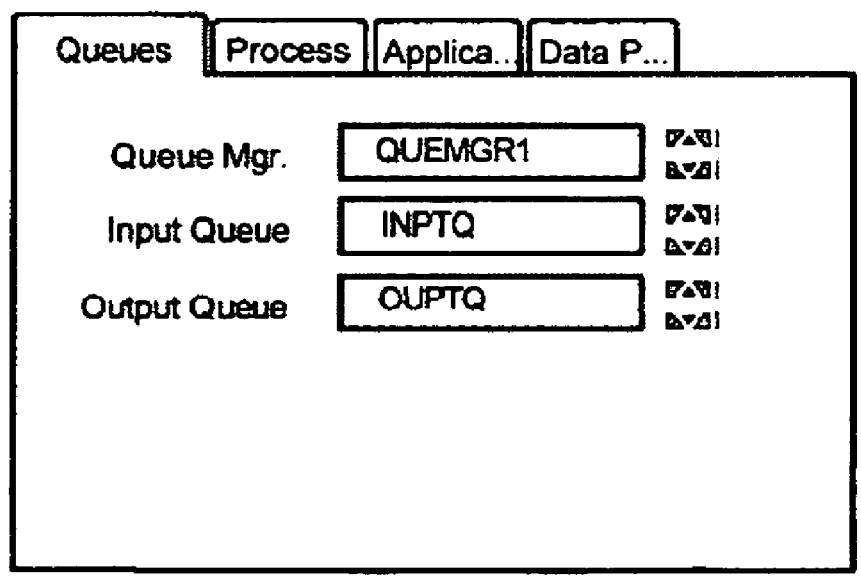
FIG. 7 shows a partial view of a preferred embodiment.

FIG. 7 shows a message queue construction tool for the sub-process identified in FIG. 6. This tool, which may be another option combined with the process tool of FIG. 6 or some other tool in various embodiments, or may be stand-alone in other embodiments, provides the ability to select a queue manager (a process that manages different message queues in various machines or applications), input queue and output queue for the particular sub-process being simulated. Each of these options, queue manager, input queue and output queue, can be changed by using the arrows to access a drop-down menu of predetermined alternatives. Once the alternatives are chosen, the module can be saved. Of course, in other embodiments non-predetermined alternatives may be used.

Figures 8, 9:
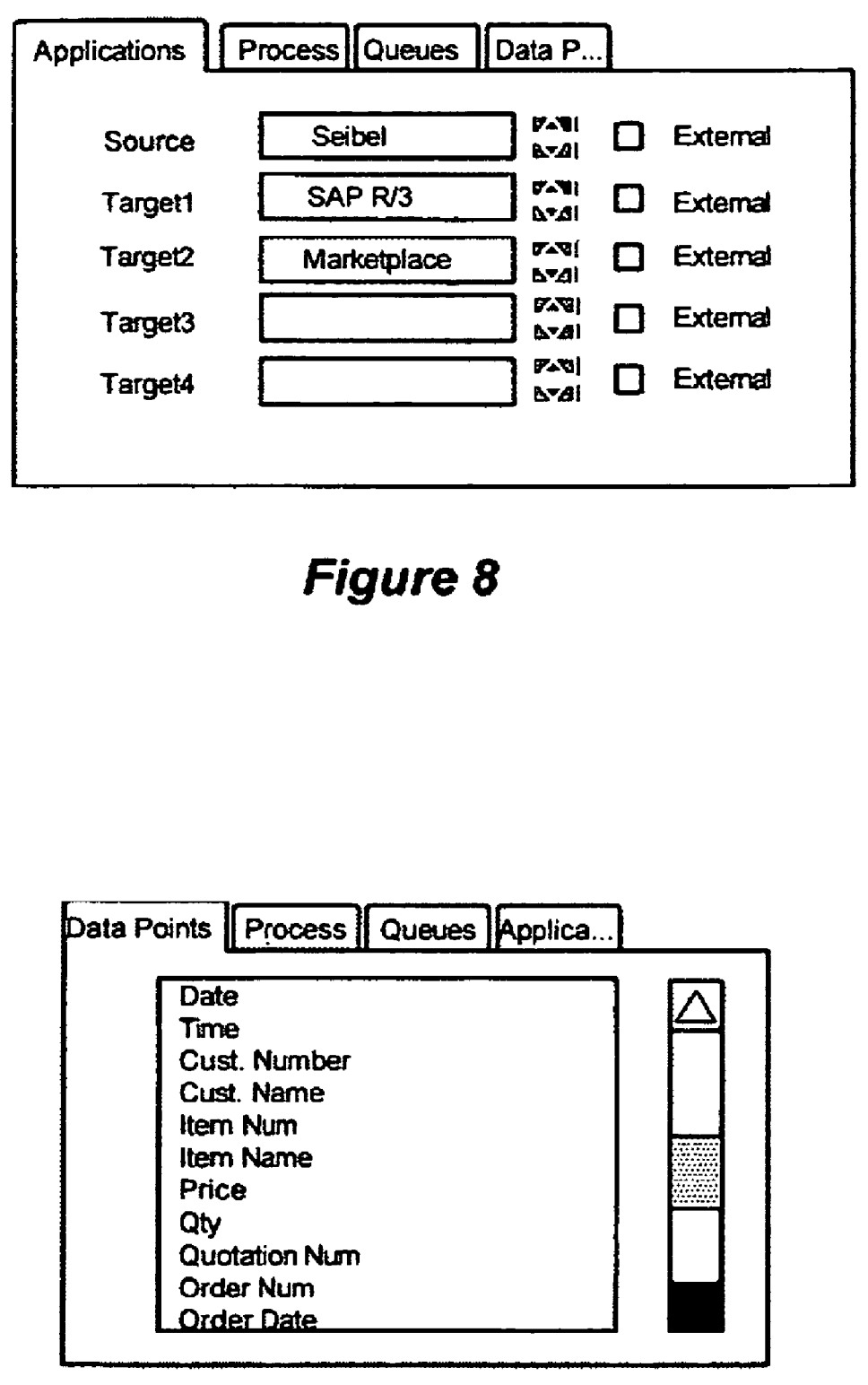

FIG. 8 shows an application construction tool, which can be used to select the applications used on either end of the queue or path. Here, there are two separate targets, one external, with a single monitoring message being sent to a central message database, before the source message is split and sent to both target applications. FIG. 9 shows the particular data fields or points that may be captured in the monitoring message. These are selected by highlighting the preferred fields in this embodiment.

Figure 10:
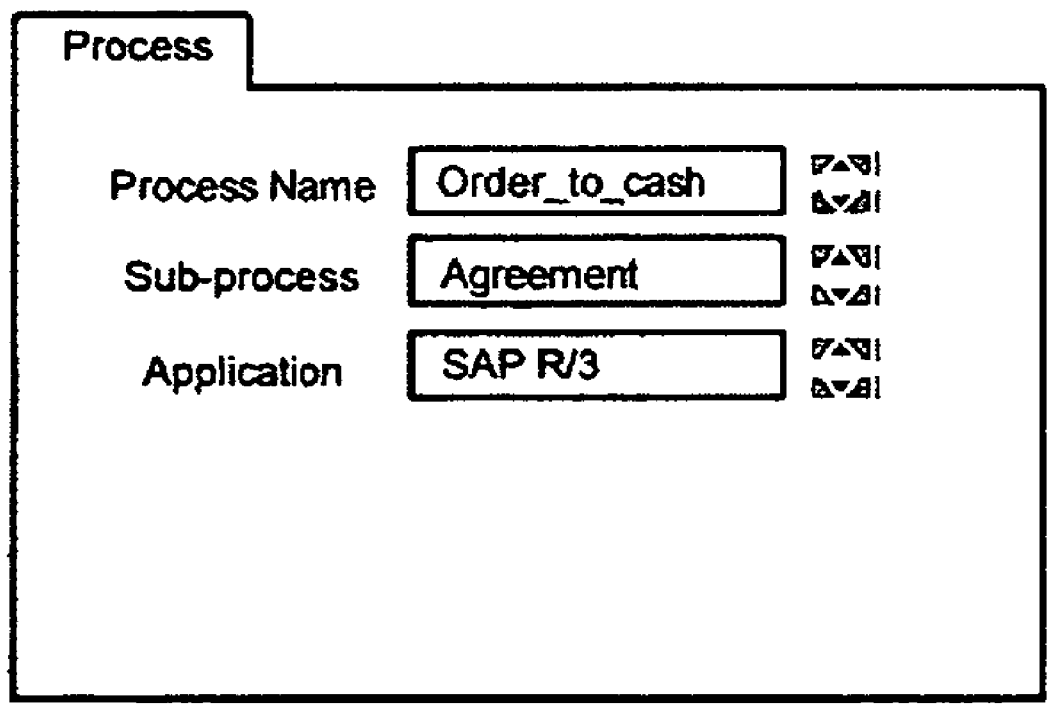
FIG. 10 shows a partial view of a preferred embodiment.

Other alternatives are possible for other embodiments of the simulation module. For example, the embodiments discussed above have some alternatives as predetermined, which makes the construction of sub-process modules more convenient. In other embodiments non-predetermined alternatives may be used. Moreover, any desired processes that are not defined in predetermined modules can be developed and made available to the user. For example, a tool such as that shown in FIG. 10 provides the ability to alter the process, the sub-process, and the application, by using the arrows to access a drop-down menu of predetermined alternatives, thus facilitating creation of new processes, sub-processes and/or activities. Other embodiments may use an "open ended" format to allow the creation of new processes and sub-processes and/or activities.

The simulation module is, in the preferred embodiments, either stand-alone or contained as part of a monitoring apparatus and/or system as had been described above. If the latter, then "real-time" data and processes, sub-processes and activities can be used in the simulation apparatus and/or process. The simulator module permits processes and sub-processes to be defined, simulated, and refined before modifying existent systems or implementing new systems.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

TABLE 1

| PATH | FIELDS | IDENTIFIERS |
|---|---|---|
| B | PROCESS IDENTIFIER | Order to cash, |
|  | SUBPROCESS IDENTIFIER | quote, |
|  | CUSTOMER NUMBER | custno, |
|  | MATTER NUMBER | matno, |
|  | QUOTE NUMBER | quote num, |
|  | QUANTITY | qty, |
|  | PRICE | price, |
|  | AMOUNT | amt, |
|  | DATE | date, |
|  | TIME | time |
| C | PROCESS IDENTIFIER | Order to cash, |
|  | SUBPROCESS IDENTIFIER | Agreement, |
|  | CUSTOMER NUMBER | custno, |
|  | MATTER NUMBER | matno, |
|  | QUOTE NUMBER | quote num, |
|  | QUANTITY | qty, |
|  | PRICE | price, |
|  | AMOUNT | amt, |
|  | DATE | date, |
|  | TIME | time |
| D | PROCESS IDENTIFIER | Order to cash, |
|  | SUBPROCESS IDENTIFIER | order, |
|  | ORDER NUMBER | ordernum, |
|  | QUOTE NUMBER | quote num, |
|  | CUSTOMER NUMBER | custno, |
|  | MATTER NUMBER | matno, |
|  | QUANTITY | qty, |
|  | PRICE | price, |
|  | AMOUNT | amt, |
|  | DATE | date, |
|  | TIME | time |
| E | PROCESS IDENTIFIER | Order to cash, |
|  | SUBPROCESS IDENTIFIER | schedule, |
|  | ORDER NUMBER | ordenum, |
|  | QUOTE NUMBER | quote num, |
|  | PRODUCTION NUMBER | production Number, |
|  | PRODUCTION DATE | Production date, |
|  | PRODUCTION LOCATION | production location, |
|  | PRODUCTION STATUS | production status, |
|  | CUSTOMER NUMBER | custno, |

TABLE 1-continued

| PATH | FIELDS | IDENTIFIERS |
|---|---|---|
| | MATTER NUMBER | matno, |
| | QUANTITY | qty, |
| | PRICE | price, |
| | AMOUNT | amt, |
| | DATE | date, |
| | TIME | time |
| F | PROCESS IDENTIFIER | Order to cash, |
| | SUBPROCESS IDENTIFIER | mfg, |
| | ORDER NUMBER | ordenum, |
| | QUOTE NUMBER | quote num, |
| | PRODUCTION NUMBER | production Number, |
| | PRODUCTION DATE | Production date, |
| | PRODUCTION LOCATION | Production location, |
| | PRODUCTION STATUS | Production status, |
| | CUSTOMER NUMBER | custno, |
| | MATTER NUMBER | matno, |
| | QUANTITY | qty, |
| | PRICE | price, |
| | AMOUNT | amt, |
| | DATE | date, |
| | TIME | time |
| G | PROCESS IDENTIFIER | Order to cash, |
| | SUBPROCESS IDENTIFIER | ship, |
| | ORDER NUMBER | ordenum, |
| | QUOTE NUMBER | quote num, |
| | PRODUCTION NUMBER | production Number, |
| | PRODUCTION DATE | Production date, |
| | PRODUCTION LOCATION | production location, |
| | PRODUCTION STATUS | production status, |
| | CUSTOMER NUMBER | custno, |
| | SHIPPING DATE | ship date, |
| | MATTER NUMBER | matno, |
| | QUANTITY | qty, |
| | PRICE | price, |
| | AMOUNT | amt, |
| | DATE | date, |
| | TIME | time |
| H | PROCESS IDENTIFIER | Order to cash, |
| | SUBPROCESS IDENTIFIER | invoice, |
| | ORDER NUMBER | ordernum, |
| | QUOTE NUMBER | quote num, |
| | CUSTOMER NUMBER | custno, |
| | SHIPPING DATE | ship date, |
| | MATTER NUMBER | matno, |
| | QUANTITY | qty, |
| | PRICE | price, |
| | AMOUNT | amt, |
| | DATE | date, |
| | TIME | time |

We claim:

1. A computerized method for simulating processes in an asynchronous messaging environment:
   providing a first predetermined sub-process and a second predetermined sub-process;
   assembling a process from said first and second predetermined sub-processes;
   providing a variable time increment for either or both said first or second predetermined sub-process so that a process may be simulated through said variable time increment or increments, wherein said variable time increments further comprise latency of either or both of said sub processes, and said variable time increment is provided by increasing or decreasing the latency of said sub process or sub processes as desired; and
   providing a display for showing the effect of said increase or decrease of said latency on said simulated process.

2. A method as in claim 1 further comprising providing a display device for a user to set said increase or decrease.

3. A method as in claim 2 wherein said display device comprises a slider.

4. A method as in claim 1 further comprising providing a predetermined toolkit of said predetermined sub-processes.

5. A method as in claim 1 further comprising at least one industry specific sub-process.

6. A method as in claim 1 further comprising providing means for creating additional sub-processes.

7. A computerized method for simulating processes in an asynchronous messaging environment, comprising:
   establishing at least one sub-process which is comprised of at least one activity;
   establishing a process which is comprised of at least one sub-process;
   providing a variable time increment for said sub-process so that said process may be simulated through said variable time increment or increments, wherein said variable time increments further comprise latency said sub processes, and said variable time increment is provided by increasing or decreasing the latency of said sub process or sub processes as desired; and
   providing a display for showing the effect of said increase or decrease of said latency on said simulated process.

8. An apparatus for simulating processes in a network based asynchronous messaging environment:
   means for providing at least one predetermined sub-process;
   means for executing said predetermined sub-process;
   means for assembling a process from said predetermined sub-process; and,
   means for providing a variable time increment for said sub-process so that said process may be simulated through said variable time increment or increments, wherein said variable time increments further comprise latency said sub processes, and said variable time increment is provided by increasing or decreasing the latency of said sub process or sub processes as desired;
   and a display for showing the effect of said increase or decrease of said latency on said simulated process.

9. An apparatus as in claim 8 further comprising a display device for a user to set said increase or decrease.

10. An apparatus as in claim 9 wherein said display device comprises a slider.

11. An apparatus as in claim 8 further comprising a predetermined toolkit of said predetermined sub-processes.

12. An apparatus as in claim 8 further comprising at least one industry specific sub-process.

13. An apparatus as in claim 8 further comprising means for creating additional sub-processes.

* * * * *